(12) United States Patent
Schumacher (10) Patent No.: US 9,203,181 B2
(45) Date of Patent: Dec. 1, 2015

(54) ELECTRICAL CONNECTION SYSTEM

(71) Applicant: Auto-Kabel Management GmbH, Hausen im Wiesental (DE)

(72) Inventor: Jens Schumacher, Hausen im Wiesental (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 14/403,314

(22) PCT Filed: Apr. 17, 2013

(86) PCT No.: PCT/EP2013/058006
§ 371 (c)(1),
(2) Date: Nov. 24, 2014

(87) PCT Pub. No.: WO2013/174581
PCT Pub. Date: Nov. 28, 2013

(65) Prior Publication Data
US 2015/0132986 A1    May 14, 2015

(30) Foreign Application Priority Data
May 25, 2012    (DE) .......................... 10 2012 010 277

(51) Int. Cl.
*H01R 13/621*    (2006.01)
*F03D 11/00*    (2006.01)
(Continued)

(52) U.S. Cl.
CPC .......... *H01R 13/621* (2013.01); *F03D 11/0066* (2013.01); *H01R 13/02* (2013.01); *H01R 13/28* (2013.01); *Y02E 10/722* (2013.01)

(58) Field of Classification Search
CPC .............................. H01R 13/02; H01R 13/621
USPC ......... 439/286, 359, 680, 294, 332, 333, 335, 439/337, 314, 316, 737, 738, 318; 174/75 R
See application file for complete search history.

(56) References Cited

U.S. PATENT DOCUMENTS

| 2,171,726 A | 9/1939 | Howell ......................... 173/363 |
| 3,784,964 A * | 1/1974 | Newman et al. .............. 439/603 |

(Continued)

FOREIGN PATENT DOCUMENTS

| DE | 27 05 798 A1 | 8/1978 | ................ F16B 7/22 |
| DE | 10 2009 033 168 A1 | 2/2011 | ............. H01R 24/84 |

(Continued)

OTHER PUBLICATIONS

International Searching Authority, International Search Report—International Application No. PCT/EP2013/058006, dated Apr. 17, 2013, together with the Written Opinion of the International Searching Authority, 12 pages.

*Primary Examiner* — Edwin A. Leon
(74) *Attorney, Agent, or Firm* — Sunstein Kann Murphy & Timbers LLP (57) ABSTRACT

The present invention relates to an electrical connection system of a means for generating electrical energy from regenerative sources, in particular from a wind turbine, comprising a first connection piece which can be joined to an end of a first cable, a longitudinal axis of the first cable determining a first longitudinal axis and a second connection piece which can be joined to an end of a second cable or to a second end of the first cable, a longitudinal axis of the first or second cable determining a second longitudinal axis, wherein the first connection piece has a seat, formed for a projection of the second connection piece, and the second connection piece has the projection corresponding to the seat, and wherein the projection can be arranged in the seat to form an electrically conductive connection between the connection pieces. To facilitate assembly, it is proposed that the seat is formed by a groove extending in a plane vertical to the first longitudinal axis, the groove passing through the first connection piece in its extension direction, that the projection extends in a plane vertical to the second longitudinal axis, that a first groove wall is inclined in the direction of the first longitudinal axis and that a lateral surface of the projection is inclined in the direction of the second longitudinal axis.

15 Claims, 5 Drawing Sheets

(51) Int. Cl.
*H01R 13/28* (2006.01)
*H01R 13/02* (2006.01)

(56) References Cited

U.S. PATENT DOCUMENTS

| | | | | |
|---|---|---|---|---|
| 5,118,303 | A | * | 6/1992 | LeBaron et al. ............... 439/286 |
| 5,658,159 | A | * | 8/1997 | Gardner et al. ............... 439/294 |
| 6,808,407 | B1 | * | 10/2004 | Cannon ........................ 439/314 |
| 7,892,042 | B2 | * | 2/2011 | Spicer et al. .................. 439/681 |
| 2013/0206473 | A1 | | 8/2013 | Gottschlich et al. ........ 174/75 R |

FOREIGN PATENT DOCUMENTS

| | | | |
|---|---|---|---|
| DE | 10 2009 033 168 A1 | 2/2011 | ............. H01R 24/84 |
| DE | 10 2010 045 921 A1 | 3/2012 | ............. H01R 24/00 |

* cited by examiner

ELECTRICAL CONNECTION SYSTEM

TECHNICAL FIELD

The subject matter relates to an electrical connection system of a unit for generating electrical energy from regenerative sources, in particular from a Wind turbine, comprising a first connection piece which can be arranged at one end of a first cable and a second connection piece which can be arranged at one end of a second cable.

BACKGROUND ART

Nowadays, electrical energy generating means, such as wind turbines, are fitted with copper or aluminium cables. However, due to the rising price of copper, fitting with aluminium cables is becoming increasingly popular. Particularly in the case of wind turbines which are between 50 m and 200 m high, large quantities of cable are required, so that the use of aluminium cables offers a considerable savings potential.

However, due to the great height of wind turbines, it is impossible to connect the generators arranged in the tower of the wind turbine by a single cable to the converter arranged in the base of the system. For this reason, cables are respectively preassembled in individual segments of the tower. To connect the cables of the individual segments, the cables have to be connected in an electrically conductive manner at the segment boundaries. As long as copper cables are used, crimping or screwing cables together is not a problem because material which adversely affects the electrical conductivity is not deposited on the copper surface, which material could lead to a reduction in the electrical conductivity of the connection during operation of the wind turbine.

However, this is different when aluminium cables are used. A crimp connection has to be protected against environmental influences. Furthermore, aluminium oxide must be prevented from forming at the connections since it significantly increases the transition resistance. In the case of cables which carry several 10 A or even several 100 A, an electrical transition resistance is always associated with a high power loss. Therefore, attempts must be made to configure the electrical transition resistance between the cables at the connection point such that it is as low as possible and, on the other hand, to provide a connection technology which can be assembled quickly.

Nowadays however, crimping the cables of the respective sections at the section boundaries is proposed. Here, a crimp sleeve is screwed onto the cables. To achieve this, the engineer has to climb into the tower, then cut the cables to length and strip them at the segment boundary. The engineer then has to coat the stripped ends of the cables with a conductive paste. This is to prevent aluminium oxide forming on the surfaces of the aluminium strands. Thereafter, the engineer has to push the crimp sleeve onto the free ends of the cables and screw it together with the cables using a lot of screws in a laborious process. The assembly described thus is time consuming and cost-intensive. Furthermore, the quality of the electrical connection is unstable, in other words over time, the electrical transition resistance increases because the conductive paste cannot fully prevent the formation of aluminium oxide.

In addition, a sufficiently effective strain relief has to be provided at the connection point. Enormous tensile forces arise at the connection point in the case of wiring harnesses of lengths of several tens of meters. Therefore, in addition to a good electrically conductive connection, a mechanically stable connection is also required. Nowadays, this is ensured by means of sturdy crimped connections and screwed connections of the cable cores.

For this reason, the object of the invention was to provide an electrical connection system which can be assembled in a particularly simple manner and which at the same time ensures a mechanical strain relief at the connection point.

This object is achieved in terms of the subject-matter by a connection system according to Claim 1.

SUMMARY OF THE INVENTION

It has been found that the crimping and screwing of aluminium cables is prone to faults and a sufficiently low transition resistance cannot be realised. It has also been found that the known assembly method is to time-consuming. Since mechanical security in respect of tensile forces in the direction of the longitudinal axes of the cables has to be ensured, the screw connections have to be made using large-diameter screws. During assembly, it is necessary to compensate the tensile forces and to fix the cables at the connection point. For this purpose, complex securing measures are required before assembly which are time-consuming. The engineer is faced with a laborious task of fixing the cables in the position to be connected. All these problems are resolved according to the subject matter.

The connection pieces have joining faces on sides facing the respective cables. The cables can preferably be arranged in a material-uniting manner on the joining faces of the respective connection pieces. Particularly in a preformed state, the cables can be welded to the joining faces. For this purpose, friction welding methods are particularly suitable, as will be described in the following. However, resistance welding methods are also suitable for producing connections between the front ends of the cables and the connection pieces or the joining faces of the connection pieces.

The first connection piece extends in the direction of a joining face for one end of the first cable. The first connection piece forms a longitudinal axis in this extension direction.

The second connection piece extends in the direction of a second joining face for a second end of the first cable or for an end of the second cable. The second connection piece also forms a longitudinal axis in this extension direction.

The first connection piece preferably has a receptacle for receiving a projection. The projection is preferably formed in the second connection piece. By inserting the projection into the receptacle, it is possible to establish an electrically conductive connection between the two connection pieces and thus between the cables arranged on the connection pieces.

A particularly simple assembly is preferably possible when the receptacle is formed by a groove which extends in a plane perpendicular to the first longitudinal axis, the groove passing through the first connection piece in its extension direction. It is possible for a groove, extending transversely to the longitudinal axis, to run in the first connection piece. This groove runs over the entire connection piece and passes through it in its extension direction at the respective sides.

The projection extends in a plane vertical to the second longitudinal axis.

In the connected state, the projection is inserted into the groove. The groove and projection then extend in the same extension direction. The longitudinal axes are then parallel to one another, preferably collinear with one another.

A first groove wall is inclined in the direction of the first longitudinal axis and a lateral surface of the projection is inclined in the direction of the second longitudinal axis. This significantly simplifies the hooking of projection and groove into one another. The projection can be pushed over a groove wall like a snap lock to then catch into the groove. The inclination of the groove wall and of the projection makes it easier to push the connection pieces over one another because they can "slide" into one another. This makes it easier for the engineer to join the connection pieces together.

It has been found that an electrical connection of the connection pieces by insertion of projection and receptacle into one another is simple when the projection and receptacle extend in a plane perpendicular to the longitudinal axis of the connection pieces. In this case, an engineer can fit the cables together particularly easily at the section boundaries. It is merely necessary to join the connection pieces together by insertion of projection and receptacle into one another.

A natural strain relief is created at the connection point due to the fact that the projection and receptacle extend in a plane perpendicular to the longitudinal axis. The projection rests against a groove wall. The groove wall absorbs the tensile forces acting in the direction of the longitudinal axis and introduces them into the cable connected to the first connection piece.

It has been found that the connection pieces can be joined together particularly easily and that at the same time a very good strain relief can be ensured when the first connection piece and the second connection piece each have a groove and a projection. It is thereby possible for a respective projection of one connection piece to lock into the respective groove, corresponding thereto, in the other connection piece and to ensure a strain relief. A groove is routinely formed by a groove base and two groove walls. It has been found that a respective groove wall can also serve as a projection in that the web forming the groove wall forms the projection. Here, it is a particular advantage when the web which is arranged on the side of the connection piece facing away from the respective joining face and which forms the groove wall, forms the projection.

The strain relief in the longitudinal direction is ensured by the projection and groove resting against one another between the connection pieces. Forces acting in the direction of the longitudinal axis are guided from the projection onto the groove wall or onto the web forming the groove wall and are thereby guided into the respective other connection piece or cable.

To protect the electrical connection between the connection pieces from shearing forces and transverse forces, it is proposed that in the connected state, the projection is fastened in the groove by a securing element. The securing element is preferably of the type which exerts a compressive force on the projection in the direction of the base of the groove. This prevents the projection from being moved out of the groove. The securing element fixes the projection in the groove.

According to an embodiment, it is proposed that the securing element passes through the base of the groove and is fastened in the projection. It is also possible for the securing element to pass through the projection and to be fastened in the base of the groove. Due to the fact that the securing element passes through either the base of the groove or the projection and is fastened in the respectively corresponding projection or groove base, a force acting in the direction of the groove base can be exerted particularly easily on the projection.

This is possible particularly advantageously when the securing element is a screw. It has been found that when aluminium or aluminium alloys is/are used for the securing elements, securing with a screw is problematic if the screw is tightened with an excessive torque. In this case, the aluminium can flow and the parts fastened together by the screw can become detached from one another. Threads can also shear off. For this reason, a shear bolt or a screw fastened with a defined torque is used to fasten the securing element. Using a dynamometric key, it is possible to tighten a bolt with a defined torque, thereby preventing the thread on the bolt or on the connection pieces from shearing off.

The projection can be inserted particularly easily into the groove when the groove wall, inclined in the direction of the first longitudinal axis, is arranged on the side of the groove facing forwards the cable. In this case, the projection, corresponding thereto, is inclined on the side facing away from the cable and can thus be pushed particularly easily over the groove wall and locked into the groove. It is also proposed that the groove wall, inclined in the direction of the first longitudinal axis, is arranged on the side of the groove facing away from the cable.

In this case, the groove wall is inclined, directed away from the cable. In the previous case, the groove wall is inclined in the direction of the cable from the base of the groove.

It is also proposed that the groove wall runs on the side of the groove, remote from the cable, parallel to the plane perpendicular to the longitudinal axis. It is also possible for the groove wall to run on the side of the groove, facing the cable, parallel to the plane perpendicular to the longitudinal axis.

According to an embodiment, it is proposed that the connection pieces are produced from aluminium or alloys thereof and that the cables are produced from aluminium, copper or alloys. The use of aluminium allows a particularly economical cabling of wind turbines, since aluminium is significantly cheaper than copper. Furthermore, the use of aluminium affords a considerable weight advantage, so that the tensile forces arising on the connection are relatively low.

To prevent the transition resistance on the connection pieces from being adversely affected due to aluminium oxide, it is proposed that the connection pieces are provided with a metallic coating. A metallic coating can be a lower layer of nickel or a tin plate layer. This prevents the formation of aluminium oxide on the surface of the connection pieces when these are formed from aluminium. A metallic coating with silver or other metals is also possible, particularly if the transition resistances have to be minimised.

According to an embodiment, it is proposed that the connection piece is joined in a material-uniting manner to the cable by butt-welding, in particular by friction welding. As already stated at the outset, assembly is particularly simple when the connection pieces engage in one another in a wedge shape, as is also proposed. The wedge-shaped engagement simultaneously allows an electrical connection and a mechanical strain relief.

To secure the joining of the connection pieces, an insulating sleeve is preferably placed around the connection pieces. To allow the insulating sleeve to absorb tensile forces in the longitudinal direction, said insulating sleeve has to rest against the connection pieces. For this reason, according to an embodiment, the connection pieces have flanges which extend in a plane perpendicular to the longitudinal axis and run at least partly around the connection pieces. Annular shoulders of insulating sleeves can rest against these flanges.

The insulating sleeve prevents environmental influences acting on the electrical connection at the connection pieces. The insulating sleeve can be configured such that it seals the electrical connection at the connection pieces, preventing moisture from reaching the electrical connection. For this purpose, it is possible, for example for the insulating sleeve to rest in a moisture-tight manner against the insulation of the cable in the region of the end of the cable. This can be realised, for example, by the use of an O ring. It is also possible for a heat-shrinkable sleeve to be placed around the insulating sleeve and to be shrunk onto the insulation of the cable.

According to an embodiment, it is proposed that an insulating sleeve engages on the flanges and holds the connection pieces against one another in the longitudinal direction.

According to an embodiment, it is proposed that the insulating sleeve is in two parts, a first part being arranged on the flange of the first connection piece and a second part being arranged on the flange of the second connection piece and the parts being mechanically interconnectable in a captive manner such that in the joined state, a force exerted by the parts on the connection pieces parallel to the longitudinal axis presses the connection pieces towards one another in the longitudinal axis. This produces a further strain relief in the longitudinal direction.

The parts of the insulating sleeve can be screwed together, for example, or are formed as a bayonet catch so that one part locks into the other.

To fasten the insulating sleeve or the parts together, they must preferably be screwed together, as described. To facilitate this screwing procedure, a groove nut is arranged on at least one part to receive a sickle spanner, it being possible to screw the first part with the second part by the groove nut. It is also proposed that the insulating housing is surrounded by a metal cage, in particular by a sheet steel cage. It has been found that the use of a metal cage on the one hand can ensure an increased mechanical strength with respect to tensile forces and on the other hand, it can make the connections less susceptible to electromagnetic disturbances. The metal cage preferably engages on the insulating housing in the region of the flanges so that tensile forces can also be absorbed by the metal cage.

A further mechanical fixing of the projection in the groove can be achieved by providing in the base of the groove an undercut which extends in the longitudinal axis. The undercut is preferably arranged in the groove wall in the region of the base of the groove and is preferably directed away from the cable of the connection piece.

A locking hook, corresponding thereto, can be arranged on a tip of the projection and can engage behind the undercut. As a result, tensile forces normal to the surface of the groove base can be compensated by the undercut and by the locking hook. This makes it difficult for the projection to be released from the groove normal to the base of the groove.

It is also possible for the preformed cables to be cut to length in the respective sections just before the section boundary and to be provided with one of the connection pieces. The section boundary can then be bridged by a connecting cable which has connection pieces complementary in each case to the cable preformed at the section boundaries. The engineer then merely has to push the connecting cable into the groove or into the projection of the respective ends of the preformed cables and thus obtains a mechanical and electrical connection of the cables among one another.

The width of the groove base and/or the inclination of a groove wall can differ for each phase in a multiphase connection system. Thus, for example, in a 3-phase system, each phase can be allocated a projection-groove pair with different width/inclination angles. Particularly in the case of wind turbines, three to seven cables are used per phase, so that nine to 21 cables are preformed per section. These cables have to be connected in correct phase to the respective cables of the other sections. To prevent a faulty connection, each phase can be provided with its own pair of connection pieces, the connection pieces of the individual phases not being complementary among one another and not matching one another. The engineer can then carry out the assembly without fearing that he is producing an incorrect phase connection. It is ensured that the cables which belong to one another are also electrically contacted with one another.

When aluminium cables are used, it is preferable for the connection pieces to also be made from aluminium. This has the advantage that no transition resistance or contact corrosion occurs at the transitions between the cables and the connection pieces. To prevent aluminium oxide from forming on the surface of the connection pieces, it is proposed that the surface of the connection pieces is tin-plated. It is also possible for the surface to be initially nickel-plated and then tin-plated. The lower layer of nickel provides a lasting coating and the tin plating makes it possible to achieve a low contact resistance.

To reliably connect the connection pieces to the cables, it is proposed that a stripped cable end is arranged in a sleeve. A secure connection method is required particularly when the connection pieces are produced from copper and when the cables are produced from aluminium. The sleeve can be pressed around the cable ends such that the individual strands or wires of the stripped cable are pressed firmly. The front end of the sleeve can then be cut off or over-milled so that the cable ends terminate at the front ends of the sleeve and are free from aluminium oxide. Thereafter, the connection piece which can have a joining face facing the end of the cable can be welded with the sleeve and the cable end along the joining face.

Here, for example friction welding, in particular rotation friction welding can be used. It is also possible to use ultrasonic welding or resistance welding to weld the connection pieces with the sleeve and the cable ends.

It is also proposed that the sleeve is formed from aluminium. In this case, the sleeve can also be tin-plated and/or nickel-plated, as described previously.

A particularly high electrical conductivity is achieved with the use of aluminium cables if they have a high purity. In particular, the use of Al 99.5 has proved to be advantageous. However, it is also possible to use higher or lower grade aluminium.

To facilitate assembly, the aluminium cables which have a large cable cross section, should be as flexible as possible. For this reason, it is also proposed that the aluminium cables are produced from soft-annealed aluminium. As a result, the cables, in particular the connection pieces arranged at the ends of the cables can be moved and thus joined together and pushed together particularly easily.

According to an embodiment, it is proposed that the cables are part of an energy transmission strand of a wind turbine. The electrical connection system is particularly suitable for connecting cables across section boundaries. The electrical connection system is also suitable for preforming cables which are arranged in the respective sections.

BRIEF DESCRIPTION OF THE DRAWINGS

In the following, the subject-matter will be described in more detail with reference to drawings illustrating an embodiment.

DETAILED DESCRIPTION OF SPECIFIC EMBODIMENTS

Figure 1:
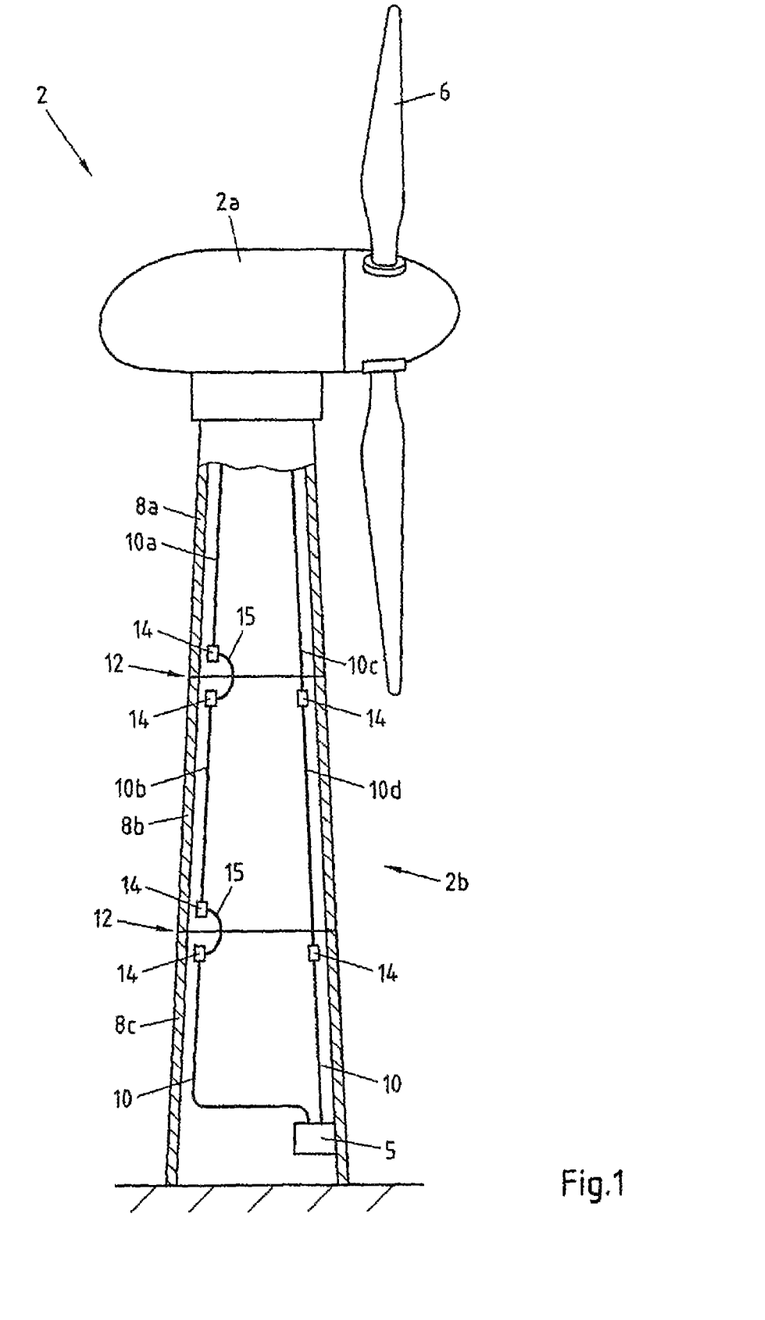
FIG. 1 shows a wind turbine with connections according to the subject-matter.

FIG. 1 shows a wind turbine 2 with a nacelle 2a and a wind wheel 6. The nacelle 2a is mounted rotatably on a tower 2b formed from sections 8a, 8b, 8c. Arranged in each section 8a-c are looms of cables 10, via which the electrical energy is conducted from the generator (not shown) arranged in the nacelle 2a to the converter 5 arranged in the base of the tower 2.

The cable looms 10 are shown by way of example. Thus, a cable loom 10a and a cable loom 10c are arranged in section 8a, for example. A plurality of cable looms 10 can be provided per phase so that it is quite possible for three cable looms 10a to be respectively provided per phase in a section 8a. The respective cables 10b, 10d are also provided in a section 8b. Further cable looms 10 are provided in section 8c.

For the assembly of a wind turbine 2, the sections 8 are supplied ready-made with cables 10. The cables 10 are already contained in the sections 8 at the start of assembly and have to be interconnected electrically and mechanically at the section boundaries 12. The connection of the cables 10 to one another is realised by the connection systems 14 which will be described in more detail in the following.

On the one hand it is possible for the cables 10a, 10b to be cut to length upstream of the section boundary 12 and to be respectively connected to a connection piece. A bridging cable 16 can connect the cables 10a, 10b across the section boundary 12. The bridging cable can have connection pieces which are complementary to the connection pieces respectively arranged at the ends of the cables.

On the other hand, it is possible for a first cable 10c to have a first connection piece 16 and for a second cable 10d to have a second connection piece 18 which is complementary thereto. The cables 10c, 10d can be preformed such that they project beyond the section boundary 12. During assembly, the connection system 14 can be assembled at the section boundary 12 so that the cables 10c and 10d are directly interconnected mechanically and electrically.

The connection systems 14 can be composed of two connection pieces which are formed such that they are complementary to one another.

Figure 2:
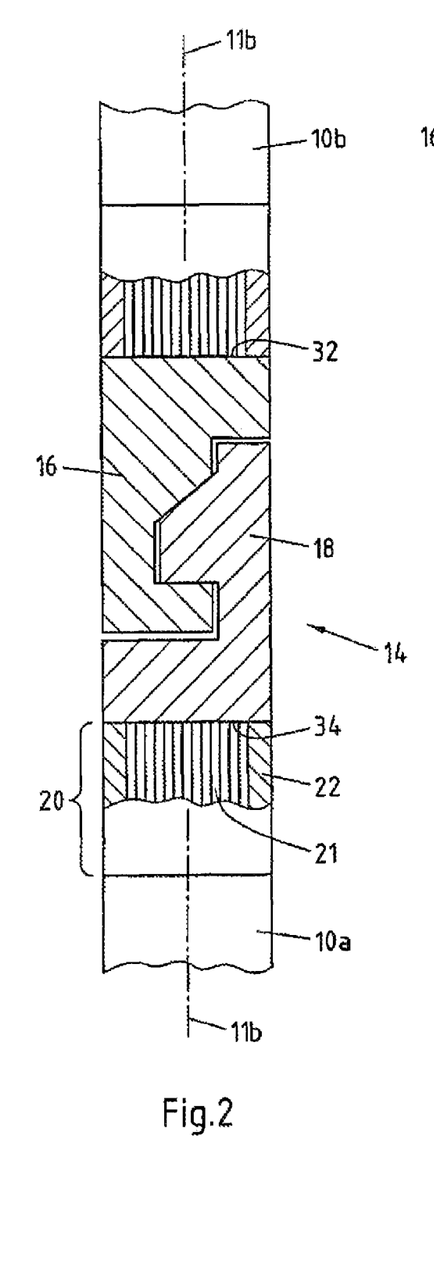
FIG. 2 is a schematic sectional view of a connection system according to the subject-matter.

FIG. 2 shows a stripped end 20 of a cable 10a. Positioned around the stripped end 20 is a sleeve 22. The cable 10a is preferably formed from aluminium strands or wires which are pressed by the sleeve 22 also formed from aluminium. For this purpose, the sleeve 22 can be pressed onto the strands. The sleeve 22 can then be ground, milled or cut together with the strands at the end face. The so formed end face 24 can then be joined in a material-uniting manner to the end face of connection piece 18 by welding, preferably by rotation friction welding. The end face 24 can form a joining face for the cable 10a.

The connection piece 18 is preferably made of aluminium. The sleeve 22 as well as the connection piece 18 can be provided with a lower layer of nickel and tin-plated. When the connection piece 18 is welded with the sleeve 22 and with the free ends of the strands 2, the surface coatings are broken up. An aluminium oxide which may have formed on the surfaces is also broken up during welding. A mono-material join between the strands 2 and the connection piece 18 is produced.

A corresponding connection is also possible between connection piece 16 and the cable 10b.

The connection pieces 16, 18 welded to the cables 10a, 10b are shown in FIG. 2. It can be seen that the connection pieces 16, 18 are hooked into one another. The connection pieces 16, 18 extend in each case parallel to the longitudinal axis 11a, 11b of a respective cable 10a, 10b. Connection piece 16 is joined to cable 10b at joining face 32. Connection piece 18 is joined to cable 10a at joining face 34. Starting from the joining faces 32, 34, the respective connection pieces 16, 18 extend parallel to the longitudinal axes 11a, 11b which are collinear with one another in the illustrated, joined state of the connection system 14.

Figure 3:
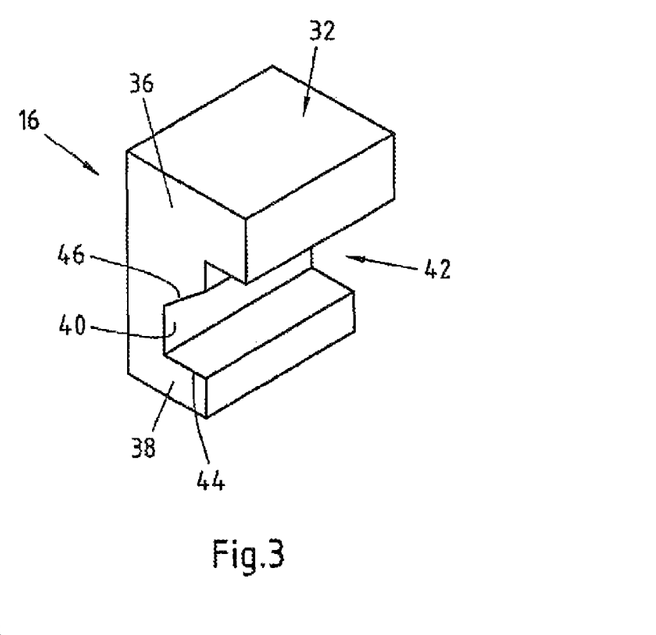
FIG. 3 is a view of a first connection piece.

FIG. 3 is a view of connection piece 16. Said connection piece 16 is formed in one piece from a flat part. Starting from the joining face 32, connection piece 16 has a first web 36 and a second web 38 which are joined together by the base 40 of a groove. The web 36, 38 and the groove base 40 form a groove 42. The groove 42 is defined by the base 40 and the walls 44, 46 of the groove. As can be seen, the groove well 46 arranged in the web 36 facing the cable is inclined in the direction of the joining face 32. The groove 42 opens from the groove base 40 due to the incline of the groove wall 46.

The web 30 shown in FIG. 3 can also serve as a projection for engaging in a groove of a connection piece 18, as can be seen in FIG. 2.

Figure 4:
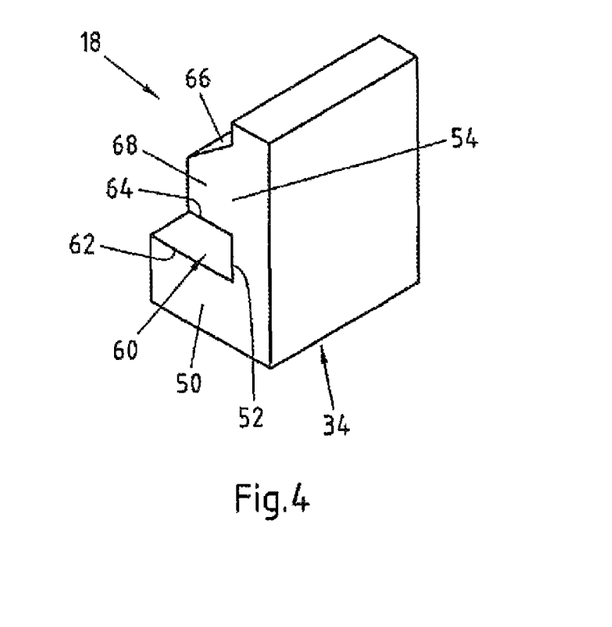
FIG. 4 is a view of a second connection piece.

FIG. 4 shows a second connection piece 18. Said second connection piece 18 is also a flat part and, starting from the joining face 34 in the direction of the longitudinal axis 11b, it has a first web 50, a groove base 52 and a second web 54.

The webs 50, 54 and the groove base 52 form a groove 60. The groove 60 has two walls 62, 64 in addition to the base 52.

Web 54 has a lateral surface 66 which is arranged on the side of the connection piece 18 facing away from the joining surface 34. The lateral surface 66 is inclined in the direction of the longitudinal axis 11a. Web 54 forms a projection 68. To join the connection pieces 16, 18 together, connection piece 18 is moved towards connection piece 16 in the direction of the longitudinal axis 11a. The lateral surface 66 comes into contact with web 38. Since the lateral surface 66 is inclined, connection piece 18 can be easily pushed onto web 38. Web 54 then slides over web 38 until web 54 or projection 68 engages in the groove 40. At the same time, web 38 engages into groove 60. The connection pieces 16, 18 hook into one another, as can be in FIG. 2.

FIGS. 3 and 4 also show that the grooves 42, 60 extend in a direction parallel to a plane, vertical to the longitudinal axes 11a, 11b and completely pass through the respective connection pieces 16, 18 and are not delimited by lateral walls.

Figures 5, 6:
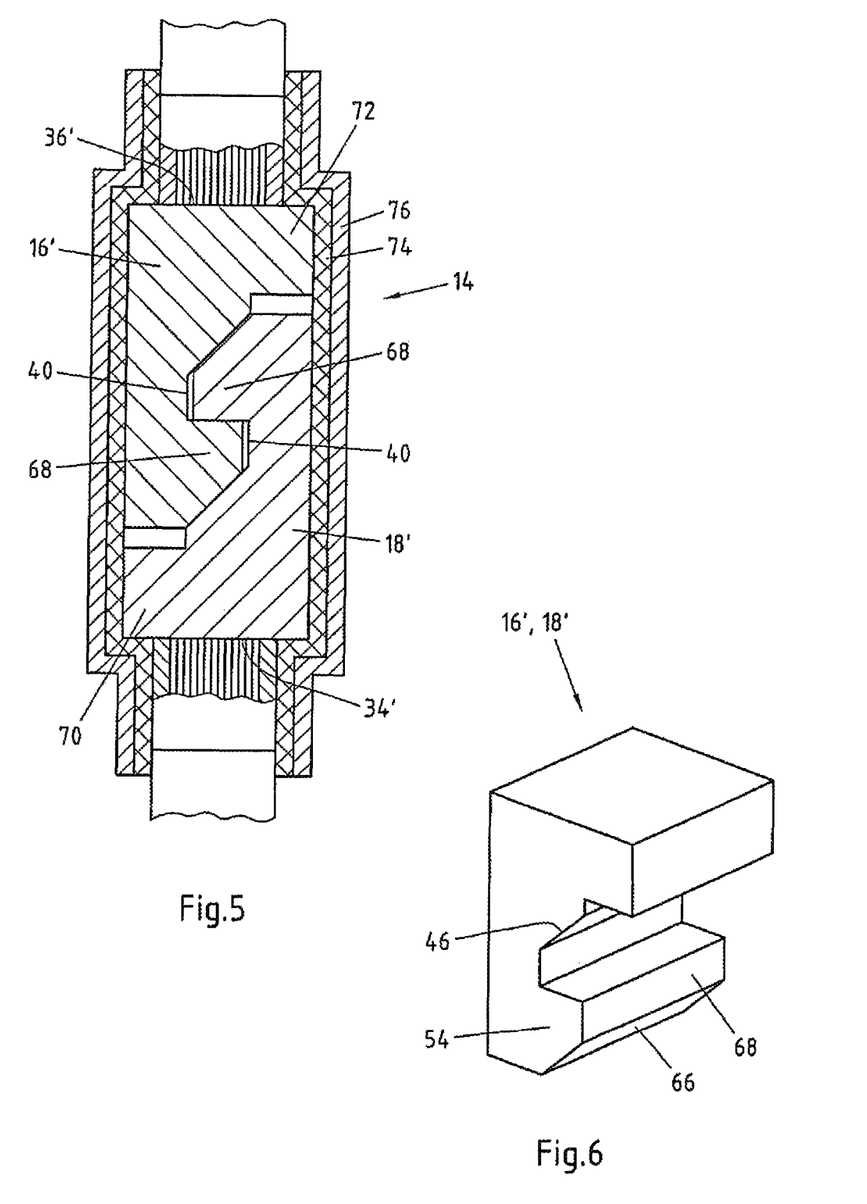
FIG. 5 is a schematic sectional view of a further connection system according to the subject-matter.
FIG. 6 is a view of a further connection piece.

FIG. 5 shows a further embodiment of a connection system 14. The connection pieces 16', 18' correspond approximately to connection pieces 16, 18. As can be seen, the connection pieces 16', 18' are, however, congruent and/or complementary to one another.

FIG. 6 is a view of these connection pieces 16', 18'. It can be seen that the lateral surface 66 directed away from the joining face is inclined in the direction of the longitudinal axis 11a, 11b and web 54 forms the projection 68. It can also be seen that the groove wall 46 facing the joining face 11a, 11b is inclined in the direction of the longitudinal axis. As can be seen in FIG. 5, the respective projection 68 of the respective connection piece 16', 18' locks into the respective groove 40 in the respective other connection piece 16', 18'.

FIG. 5 also shows that the connection pieces 16', 18' have flanges 70, 72. An insulating sleeve 74 rests on these flanges 70, 72. The insulating sleeve 74 can be formed as a screw connection or bayonet catch.

Placed over the insulating sleeve 74 is a metal cage 76 which also rests on the flanges 70, 72. Said metal cage 76 ensures electromagnetic shielding of the connection system 14.

Figure 7:
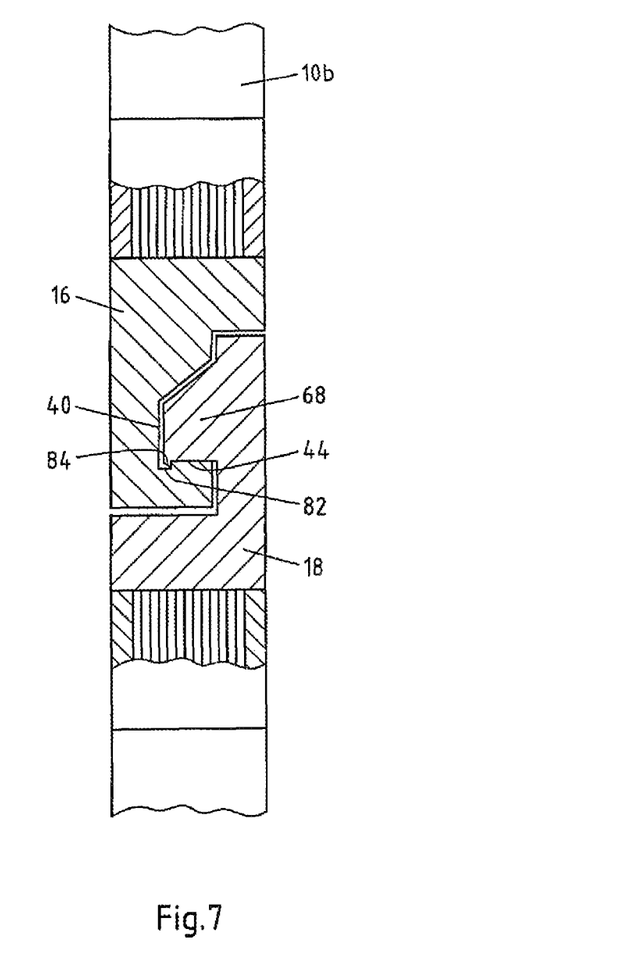
FIG. 7 is a schematic sectional view of a further connection system according to the subject-matter.

FIG. 7 shows a connection system with connection pieces 16, 18 approximately corresponding to FIG. 2.

It can be seen that an undercut 82 is provided in the groove wall 44 of connection piece 16. The undercut 82 runs in the direction of the groove and extends in the groove wall 44 directed away from the cable 10b. A locking hook 84 arranged on the projection 68 engages in the undercut 82. The locking of locking hook 84 in the undercut 82 prevents connection piece 18 from being able to be removed from connection piece 16 normally to the groove base 40.

Figure 8:
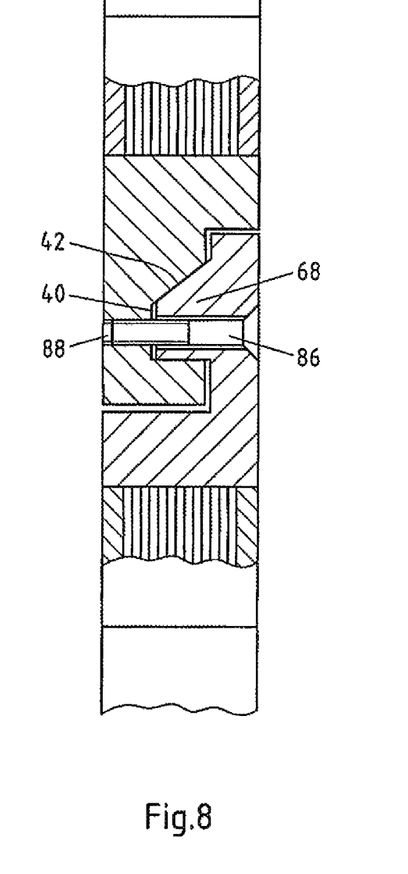
FIG. 8 is a further schematic sectional view of a connection system.

FIG. 8 shows a further securing measure against the removal of connection piece 18 from connection piece 16 or against the removal of projection 68 from groove 42. Here it can be seen that arranged in projection 68 is a screw 86 which is screwed into a thread 88 in the base 40 of groove 42. Screw 86 also prevents the projection 68 from being removed from groove 42 normally to the groove base 40.

Figure 9:
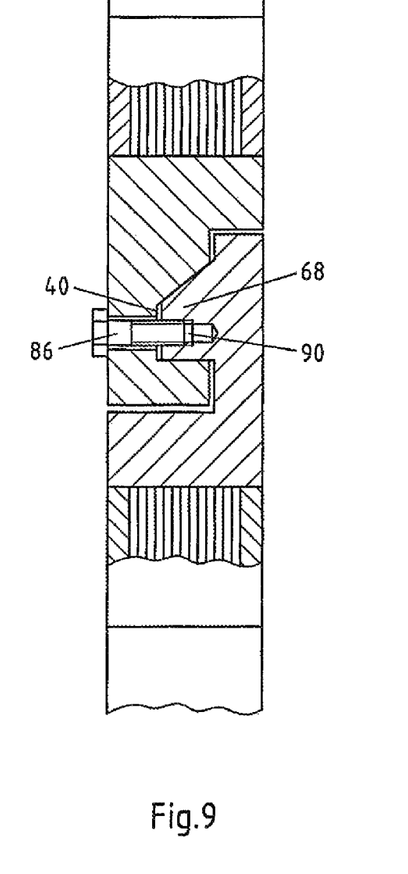
FIG. 9 is a further sectional view of a connection system.

FIG. 9 shows a further possibility where, unlike in FIG. 8, the screw 86 pushes through the groove base 40 and not the projection 68. The screw 86 is screwed into a thread 90 on the projection 68.

What is claimed is:

1. Electrical connection system of a means for generating electrical energy from regenerative sources, comprising:
    a first connection piece which can be joined to an end of a first cable, a longitudinal axis of the first cable determining a first longitudinal axis and
    a second connection piece which can be joined to an end of a second cable or to a second end of the first cable, a longitudinal axis of the first or second cable determining a second longitudinal axis,
    wherein the first connection piece has a receptacle, formed for a projection of the second connection piece, and the second connection piece has the projection corresponding to the receptacle, and
    wherein the projection can be arranged in the receptacle to form an electrically conductive connection between the connection pieces,
    wherein the receptacle is formed by a groove extending in a plane perpendicular to the first longitudinal axis, the groove passing through the first connection piece in its extension direction,
    in that the projection extends in a plane perpendicular to the second longitudinal axis,
    in that a first groove wall is inclined in the direction of the first longitudinal axis and in that a lateral surface of the projection is inclined in the direction of the second longitudinal axis,
    in the connected state, the projection is fastened in the groove by a securing element, and
    the securing element passes through the base of the groove and is fastened in the projection or in that the securing element passes through the projection and is fastened in the base of the groove.

2. Electrical connection system of claim 1, wherein the first connection piece and the second connection piece each have a groove and/or a projection such that a web arranged on the side of the connection piece facing away from the respective cable and forming a groove wall forms the respective projection.

3. Electrical connection system of claim 1, wherein the securing element is a shear bolt or a screw fastened with a defined torque.

4. Electrical connection system of claim 1, wherein the groove wall inclined in the direction of the first longitudinal axis is arranged on the side of the groove remote from the cable or in that the groove wall inclined in the direction of the first longitudinal axis is arranged on the side of the groove facing the cable.

5. Electrical connection system of claim 1, wherein the groove wall extends on the side of the groove facing away from the cable parallel to the plane perpendicular to the longitudinal axis.

6. Electrical connection system of claim 1, wherein the groove wall extends on the side of the groove facing forwards the cable parallel to the plane perpendicular to the longitudinal axis.

7. Electrical connection system of claim 1, wherein the connection pieces are formed from aluminium or alloys thereof and in that the cables are formed from aluminium, copper or alloys thereof.

8. Electrical connection system of one of claim 1, wherein the connection pieces are provided with a metallic coating, in particular are provided with a lower nickel layer and/or are tin-plated.

9. Electrical connection system of claim 1, wherein the connection pieces are joined to the cable in a material-uniting manner by butt welding.

10. Electrical connection system of claim 1, wherein the connection pieces engage in one another in a wedge-shaped manner.

11. Electrical connection system of claim 1, wherein the connection pieces are surrounded by an insulating housing.

12. Electrical connection system of claim 11, wherein the insulating housing is arranged on flanges, facing the respective cable, of the connection pieces such that tensile forces acting in the direction of the longitudinal axis can be absorbed by the housing.

13. Electrical connection system of claim 11, wherein the insulating housing is surrounded by a metal cage.

14. Electrical connection system of claim 1, wherein an undercut extending in the longitudinal axis is provided in the base of the groove.

15. Electrical connection system of claim 14, wherein the projection has on its tip a locking hook corresponding to the undercut.

* * * * *